(12) United States Patent
Nitschke

(10) Patent No.: US 7,682,702 B2
(45) Date of Patent: Mar. 23, 2010

(54) PROCESS FOR PREPARING WATER-ABSORBING POLYMER PARTICLES

(75) Inventor: Meinhard Nitschke, Bad Bergzabern (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/092,754

(22) PCT Filed: Nov. 10, 2006

(86) PCT No.: PCT/EP2006/068330

§ 371 (c)(1),
(2), (4) Date: May 6, 2008

(87) PCT Pub. No.: WO2007/057350

PCT Pub. Date: May 24, 2007

(65) Prior Publication Data

US 2008/0287631 A1    Nov. 20, 2008

(30) Foreign Application Priority Data

Nov. 16, 2005   (DE) ................. 10 2005 055 077

(51) Int. Cl.
*B32B 27/08* (2006.01)
*B32B 27/42* (2006.01)

(52) U.S. Cl. .................. 428/503; 241/24; 241/28; 241/29; 264/2.6; 264/140; 424/445; 424/486; 424/487; 428/327; 428/500; 514/55; 514/57; 560/209; 560/222; 562/545; 562/547; 604/367; 604/368

(58) Field of Classification Search ............ 241/24.28, 241/29; 264/2.6, 140; 424/445, 486, 487; 428/327, 500, 503; 514/55, 57; 560/209, 560/222; 562/545, 547; 604/367, 368
See application file for complete search history.

(56) References Cited

U.S. PATENT DOCUMENTS

| | | | |
|---|---|---|---|
| 6,641,064 B1 | 11/2003 | Dentler et al. | |
| 2001/0038831 A1* | 11/2001 | Park et al. | 424/78.31 |
| 2004/0110914 A1* | 6/2004 | Nakahara et al. | 526/317.1 |
| 2005/0046069 A1* | 3/2005 | Sasabe et al. | 264/140 |

FOREIGN PATENT DOCUMENTS

| | | |
|---|---|---|
| DE | 198 49 499 | 5/2000 |
| EP | 0 497 623 | 8/1992 |
| EP | 0 508 810 | 10/1992 |
| EP | 0 574 248 | 12/1993 |
| EP | 0 948 997 | 10/1999 |
| JP | 06-073518 | 3/1994 |
| JP | 06-107800 | 4/1994 |

OTHER PUBLICATIONS

International Search Report in PCT/EP2006/068330, filed Mar. 6, 2007.
Buchholz et al., Modern Superabsorbent Polymer Technology, pp. 69-117 (1998).
Ullmann et al., Ullmann's Encyclopedia of Industrial Chemistry, 6th ed., vol. 35, pp. 1-21, New York: Wiley, 2005.

* cited by examiner

*Primary Examiner*—Terressa M Boykin
(74) *Attorney, Agent, or Firm*—Marshall, Gerstein & Borun LLP

(57) ABSTRACT

A process for producing water-absorbing polymeric particles comprises the steps of
i) drying a hydrogel to produce a dried hydrogel,
ii) separating incompletely dried polymeric particles from the dried hydrogel, and
iii) drying the separated-off incompletely dried polymeric particles,
wherein the separated incompletely dried polymeric particles are comminuted before said drying iii).

19 Claims, No Drawings

PROCESS FOR PREPARING WATER-ABSORBING POLYMER PARTICLES

CROSS-REFERENCE TO RELATED APPLICATIONS

This is the U.S. national phase application of International Application No. PCT/EP/2006/068330, filed Nov. 10, 2006, which claims the benefit of German patent application No. 10 2005 055 077.0, filed Nov. 16, 2005.

The present invention relates to a process for producing water-absorbing polymeric particles wherein incompletely dried polymeric particles are separated off and comminuted before supplementary drying.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products swellable in aqueous fluids, such as guar derivatives for example. Such polymers are used as products capable of absorbing aqueous solutions to produce diapers, tampons, sanitary napkins and other hygiene articles, but also as water-retaining agents in market gardening.

The production of water-absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, Volume 35, pages 73 to 103.

Water-absorbing resins typically have a Centrifuge Retention Capacity in the range from 15 to 60 g/g, preferably of at least 20 g/g, more preferably of at least 25 g/g, even more preferably of at least 30 g/g and most preferably of at least 35 g/g. Centrifuge Retention Capacity (CRC) is determined by EDANA (European Disposables and Nonwovens Association) recommended test method No. 441.2-02 "Centrifuge retention capacity".

To improve their performance characteristics, for example Saline Flow Conductivity (SFC) in the diaper and Absorbency Under Load (AUL), water-absorbing polymeric particles are generally postcrosslinked. This postcrosslinking can be carried out in the aqueous gel phase. Preferably, however, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the hydrophilic polymer or capable of crosslinking together at least two carboxyl groups or other functional groups of at least two different polymeric chains of the base polymer.

The as-polymerized hydrogels are preferably dried on belt dryers. In the process, inhomogeneities mean that the gel layer is often dried nonuniformly in that either parts of the hydrogel have to be overdried, causing product quality to suffer, or parts of the hydrogel are only incompletely dried. Incompletely dried polymeric particles lead to problems in subsequent processing steps and have to be separated off.

Processes for avoiding incompletely dried polymeric particles in drying are known for example from JP-A-06-73518, JP-A-06-107800, EP-A-0 497 623, EP-A-0 508 810 and EP-A-0 574 248.

JP-A-06-73518 describes a process for drying hydrogels on a belt dryer wherein dryer power output is continuously adjusted to current thickness of the gel layer whereby the fraction of incompletely dried polymeric particles is reduced.

JP-A-06-107800 teaches that the overdrying and the separation of incompletely dried polymeric particles can be avoided by removing oversize lumps before drying.

EP-A-0 497 623 discloses a process wherein the hydrogel is extruded before drying.

EP-A-0 508 810 and EP-A-0 574 248 teach the use of a specific kneader as a polymerization reactor whereby comparatively large hydrogel particles are avoided before drying.

The separation of incompletely dried polymeric particles is described in EP-0 948 997 for example.

EP-A-0 948 997 discloses a process for continuous production of water-absorbing polymers wherein incompletely dried polymeric particles are separated off and if appropriate recycled into the drying stage.

The present invention has for its object to provide an improved process for continuous production of water-absorbing polymeric particles.

The present invention further has for its object to provide a process for continuous production of water-absorbing polymeric particles which is suitable for increasing the capacity of existing manufacturing plant, especially without enlargement of existing plant components.

We have found that this object is achieved by a process for producing water-absorbing polymeric particles comprising the steps of i) drying a hydrogel to produce a dried hydrogel,
ii) separating incompletely dried polymeric particles from the dried hydrogel, and
iii) drying the separated-off incompletely dried polymeric particles, wherein the separated incompletely dried polymeric particles are comminuted before said drying iii).

The drying i) is preferably carried out using belt dryers and more preferably circulating air belt dryers.

A preferred embodiment utilizes the same dryer for drying i) and drying iii).

The water content of the hydrogel after drying i) is customarily in the range from 1% to 20% by weight, preferably less than 10% by weight and more preferably less than 5% by weight, the specified water contents merely being average values owing to possible inhomogeneities.

The separated incompletely dried polymeric particles customarily have a particle diameter of at least 5 mm and preferably at least 10 mm and are customarily separated off by means of a sieve having a suitable mesh size. The amount of the separated incompletely dried polymeric particles is customarily less than 50% by weight, preferably less than 35% by weight and more preferably less than 25% by weight, based on the dried hydrogel.

The separated incompletely dried polymeric particles have a higher water content than the dried hydrogel. Customarily, the water content of the separated incompletely dried polymeric particles is in the range from 10% to 30% by weight, the water content customarily increasing with the particle diameter.

Useful dryers for drying the separated incompletely dried polymeric particles are not subject to any restriction.

In a preferred embodiment of the present invention, the separated incompletely dried polymeric particles are comminuted by means of a roll mill.

Roll mills have a gap width of preferably less than 10 mm, more preferably less than 8 mm and most preferably less than 6 mm. The gap width of these roll mills is preferably at least 1 mm, more preferably at least 1.5 mm and most preferably at least 2 mm.

The use of a rollmill in this process step avoids the formation of dust, i.e., of small polymeric particles, for example having a particle diameter of less than 10 μm.

Preferably, the comminuted incompletely dried polymeric particles are classified to obtain a sieve fraction of comparatively large particles as coarse size. Tumble sieving machines are particularly suitable for this.

Coarse size customarily has a particle diameter of at least 5 mm and preferably of at least 10 mm and is customarily separated off by means of a sieve having a suitable mesh size. The amount of coarse size is customarily less than 70% by weight, preferably less than 50% by weight and more preferably less than 40% by weight, based on the comminuted incompletely dried polymeric particles.

The present invention's comminution and classification makes it possible to obtain sieve fractions having distinctly different water contents. The sieve fraction having the comparatively small particles and the comparatively low water content can be recycled into the process, preferably into the separating step ii), without further drying.

Coarse size can be directly transferred into the drying step iii).

But it is advantageous first to comminute the coarse size to obtain a comminuted coarse size.

More preferably, the coarse size is comminuted by means of a mill having sharp beaters or blades and also a sieve as grinding space bound. The mesh size of the sieve is preferably at most 35 mm, more preferably at most 30 mm and most preferably at most 25 mm. The comminuted coarse size may be dried, preferably in the drying step i).

Preferably, the comminuted coarse size is classified to obtain sieve fractions having different water contents. Tumble sieving machines are particularly suitable for this.

More preferably, the comminuted coarse size is divided into two sieve fractions, and small particles, the undersize, are preferably recycled without further drying into the process, preferably into the separating step ii), and only large particles, the oversize, are transferred into the drying step iii).

It is very particularly preferred to divide the comminuted coarse size into three sieve fractions, and large particles, the oversize, are preferably recycled into the comminution of the coarse size, the midsize is transferred into the drying step iii) and small particles, the undersize, are preferably recycled into the process without further drying.

The particle diameter of the oversize is preferably at least 10 mm, more preferably at least 20 mm and most preferably at least 30 mm.

The particle diameter of the undersize is preferably less than 5 mm, more preferably less than 3 mm and most preferably less than 2 mm.

Midsize is the sieve fraction between oversize and undersize and is preferably recycled into the drying step i).

Undersize is preferably recycled into the separating step ii).

The amount of undersize preferably less than 10% by weight, more preferably less than 5% by weight and most preferably less than 2% by weight, all based on the total amount of separated incompletely dried polymeric particles. The water content of undersize is customarily in the range from 5% to 10% by weight.

Despite its relatively high water content, undersize can be recycled without additional drying.

However, the comminuted incompletely dried polymeric particles can also be further comminuted during drying iii).

In this case, the mechanical energy introduced during drying is preferably at least 50 kJ, more preferably at least 100 kJ and most preferably at least 150 kJ, all based on 1 kg of comminuted dried polymeric particles. Shovel dryers are preferably used for this. The energy introduced can be determined by the mechanical power consumption of the dryer.

The comminuted dried polymeric particles can be recycled into the separating step ii) or preferably first further comminuted.

The comminuted dried polymeric particles are particularly suitably further comminuted using roll mills, preferably having a gap width of less than 2 mm, more preferably of less than 1.5 mm, and most preferably of less than 1 mm.

The water-absorbing polymeric particles producible in the process of the present invention can be produced by addition polymerization of a monomer solution comprising
  a) at least one ethylenically unsaturated acid-functional monomer,
  b) at least one crosslinker,
  c) if appropriate one or more ethylenically and/or allylically unsaturated monomers copolymerizable with a), and
  d) if appropriate one or more water-soluble polymers onto which the monomers a), b) and if appropriate c) can be at least partly grafted,
the base polymer obtained being dried, classified,
  e) if appropriate aftertreated with at least one postcrosslinker, dried and thermally postcrosslinked.

Suitable monomers a) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. Acrylic acid is most preferable.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

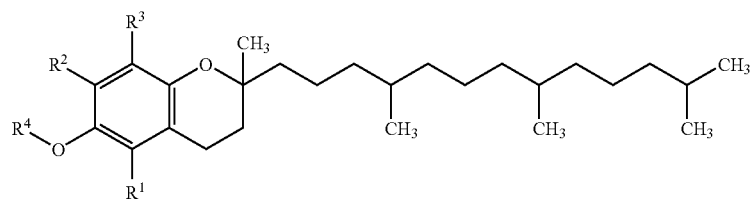

where $R^1$ is hydrogen or methyl, $R^2$ is hydrogen or methyl, $R^3$ is hydrogen or methyl and $R^4$ is hydrogen or an acid radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The water-absorbing polymers are in a crosslinked state, i.e., the addition polymerization is carried out in the presence of compounds having two or more polymerizable groups which can be free-radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP-A-0 530 438, di- and triacrylates as described in EP-A-0 547 847, EP-A-0 559 476, EP-A-0 632 068, WO 93/21237, WO 03/104299, WO 03/104300, WO 03/104301 and in German patent application 10331450.4, mixed acrylates which, as well as acrylate groups, comprise further ethylenically unsaturated groups, as described in German patent applications 10331456.3 and 10355401.7, or crosslinker mixtures as described for example in DE-A 195 43 368, DE-A 196 46 484, WO 90/15830 and WO 02/32962.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth) acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in prior German patent application DE 10319462.2. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension compared with water at the same temperature (typically not less than 0.068 N/m).

The amount of crosslinker b) is preferably at least 0.001 mol %, more preferably at least 0.01 mol % and most preferably at least 0.1 mol %, and preferably up to 10 mol %, more preferably up to 5 mol % and most preferably up to 2 mol %, all based on monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The preparation of a suitable polymer and also further useful hydrophilic ethylenically unsaturated monomers a) are described in DE-A-199 41 423, EP-A-0 686 650, WO 01/45758 and WO 03/104300.

The reaction is preferably carried out in a kneader as described for example in WO 01/38402, or on a belt reactor as described for example in EP-A 955 086.

Advantageously, the hydrogel after leaving the polymerization reactor is stored at a comparatively high temperature, preferably at least 50° C., more preferably at least 70° C. and most preferably at least 80° C. and also preferably less than 100° C., for example in insulated containers. Storage, typically for 2 to 12 hours, further increases monomer conversion.

The acid groups of the hydrogels obtained are typically in a partially neutralized state, the extent of neutralization preferably being in the range from 25 to 95 mol %, more preferably in the range from 27 to 80 mol % and even more preferably in the range from 27 to 30 mol % or from 40 to 75 mol %, for which the customary neutralizing agents can be used, for example alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof.

Neutralization is preferably carried out at the monomer stage. This is customarily accomplished by admixing the neutralizing agent as an aqueous solution, as a melt or else preferably as a solid material. For example, sodium hydroxide having a water fraction of distinctly below 50% by weight can be present as a waxy mass having a melting point above 23° C. In this case, metering as piece goods or melt at elevated temperature is possible.

Neutralization can be carried out after polymerization, at the hydrogel stage. But it is also possible to neutralize up to 40 mol %, preferably from 10 to 30 mol % and more preferably from 15 to 25 mol % of the acid groups before polymerization by adding a portion of the neutralizing agent to the monomer solution and setting the desired final degree of neutralization only after polymerization, at the hydrogel stage. When the hydrogel is neutralized at least partly after polymerization, the hydrogel is preferably mechanically comminuted, for example by means of a meat grinder, in which case the neutralizing agent can be sprayed, sprinkled or poured on and then carefully mixed in. To this end, the gel mass obtained can be repeatedly grindered for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. 430.2-02 "Moisture content". Selectively, drying can also be carried out using a fluidized bed dryer or a heated plowshare mixer. To obtain particularly white products, it is advantageous to dry this gel by ensuring rapid removal of the evaporating water. To this end, the dryer temperature must be optimized, the air feed and removal has to be policed, and at all times sufficient venting must be ensured. Drying is naturally all the more simple—and the product all the more white—when the solids content of the gel is as high as possible. The solids content of the gel prior to drying is therefore preferably between 30% and 80% by weight. It is particularly advantageous to vent the dryer with nitrogen or some other non-oxidizing inert gas. Selectively, however, simply just the partial pressure of the oxygen can be lowered during drying to prevent oxidative yellowing processes. But in general adequate venting and removal of the water vapor will likewise still lead to an acceptable product. A very short drying time is generally advantageous with regard to color and product quality.

A further important function of drying the gel is the ongoing reduction in the residual monomer content of the superabsorbent. This is because any residual initiator will decompose during drying, leading to any residual monomers becoming interpolymerized. In addition, the evaporating amounts of water will entrain any free water-vapor-volatile monomers still present, such as acrylic acid for example, and thus likewise lower the residual monomer content of the superabsorbent.

The dried hydrogel is then ground and classified, useful grinding apparatus typically including single or multiple stage roll mills, preferably two or three stage roll mills, pin mills, hammer mills or swing mills.

To improve their performance characteristics, such as Saline Flow Conductivity (SFC) in the diaper and Absorbency Under Load (AUL), water-absorbing polymeric particles are generally postcrosslinked. This postcrosslinking can be carried out in the aqueous gel phase. Preferably, however, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the hydrophilic polymer or capable of crosslinking together at least two carboxyl groups or other functional groups of at least two different polymeric chains of the base polymer.

Useful postcrosslinkers are compounds comprising two or more groups capable of forming covalent bonds with the carboxylate groups of the polymers. Useful compounds are for example alkoxysilyl compounds, polyaziridines, polyamines, polyamidoamines, di- or polyglycidyl compounds as described in EP-A-0 083 022, EP-A 543 303 and EP-A 937 736, polyhydric alcohols as described in DE-C 33 14 019, DE-C 35 23 617 and EP-A 450 922, or β-hydroxyalkylamides as described in DE-A 102 04 938 and U.S. Pat. No. 6,239,230. It is also possible to use compounds of mixed functionality, such as glycidol, 3-ethyl-3-oxetanemethanol (trimethylolpropaneoxetane), as described in EP-A 1 199 327, aminoethanol, diethanolamine, triethanolamine or compounds which develop a further functionality after the first reaction, such as ethylene oxide, propylene oxide, isobutylene oxide, aziridine, azetidine or oxetane.

Useful postcrosslinkers are further said to include by DE-A 40 20 780 cyclic carbonates, by DE-A 198 07 502 2-oxazolidone and its derivatives, such as N-(2-hydroxyethyl)-2-oxazolidone, by DE-A 198 07 992 bis- and poly-2-oxazolidones, by DE-A 198 54 573 2-oxotetrahydro-1,3-oxazine and its derivatives, by DE-A 198 54 574 N-acyl-2-oxazolidones, by DE-A 102 04 937 cyclic ureas, by German patent application 10334584.1 bicyclic amide acetals, by EP-A 1 199 327 oxetanes and cyclic ureas and by WO 03/031482 morpholine-2,3-dione and its derivatives.

Postcrosslinking is typically carried out by spraying a solution of the postcrosslinker onto the hydrogel or the dry base-polymeric particles. Spraying is followed by thermal drying, and the postcrosslinking reaction can take place not only before but also during drying.

The spraying with a solution of crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex ® mixers, Nauta ® mixers, Processall ® mixers and Schugi® mixers.

Contact dryers are preferable, shovel dryers more preferable and disk dryers most preferable as apparatus in which thermal drying is carried out. Suitable dryers include for example Bepex ® dryers and Nara ® dryers. Fluidized bed dryers can be used as well.

Drying can take place in the mixer itself, by heating the shell or blowing warm air into it. It is similarly possible to use a downstream dryer, for example a tray dryer, a rotary tube oven or a heatable screw. But it is also possible for example to utilize an azeotropic distillation as a drying process.

Preferred drying temperatures range from 50 to 250° C., preferably from 50 to 200° C., and more preferably from 50 to 150° C. The preferred residence time at this temperature in the reaction mixer or dryer is below 30 minutes and more preferably below 10 minutes.

The present invention further provides processes for producing hygiene articles comprising the use of water-absorbing polymers produced in accordance with the present invention.

The process of the present invention provides water-absorbing polymeric particles of constant quality. The comminuted incompletely dried polymeric particles are dried more efficiently. The fraction of incompletely dried polymeric particles recycled into the drying step is additionally reduced, which further raises the dryer capacity.

Methods:

The measurements should be carried out, unless otherwise stated, at an ambient temperature of 23±2° C. and a relative humidity of 50±10%. The water-absorbing polymers are thoroughly commixed prior to the measurement.

Water content

The water content of water-absorbing polymeric particles is determined by EDANA (European Disposables and Nonwovens Association) recommended test method No. 430.2-02 "Moisture content".

EDANA test methods are obtainable for example at European Disposables and Nonwovens Association, Avenue Eugene Plasky 157, B-1030 Brussels, Belgium.

EXAMPLES

Example 1

An acrylic acid solution 72 mol % neutralized with aqueous sodium hydroxide solution was polymerized in a batch kneader together with polyethylene glycol diacrylate (diacrylate of polyethylene glycol having an average molecular weight of 400 g/mol). The crumbly polymer gel obtained was dried at 160° C. in a circulating air belt dryer. The dried polymer gel was coarsely comminuted by means of a spiked roll while still in the belt dryer.

The incompletely dried polymeric particles were separated off by means of a sieve having a mesh size of 10 mm. The fraction of separated incompletely dried polymeric particles having a particle diameter of above 10 mm was 13% by weight.

21.9 kg of separated incompletely dried polymeric particles were comminuted by means of a roll mill having a gap width of less than 6 mm and sieved using a sieve having a mesh size of 10 mm. 13.3 kg of polymeric particles having a diameter of less than 10 mm and a water content of less then 1.5% by weight were obtained, and were recycled into the process without further drying.

8.6 kg of separated coarse size having a particle diameter of above 10 mm were comminuted in a mill having sharp beater and a sieve having a mesh size of less than 25 mm as grinding space bound. Analysis of the comminuted coarse size revealed the following values (multiple determination):

| Particle diameter | Amount | Water content |
| --- | --- | --- |
| >4 mm | 6.5 kg | 12-20 wt % |
| 2 to 4 mm | 0.4 kg | 8-10 wt % |
| <2 mm | 1.7 kg | 7-9 wt % |

The comminuted coarse size was sieved with two sieves having a mesh size of 30 mm and 2 mm. Particles having a diameter greater than 30 mm were returned into the mill, particles having a diameter in the range from 2 to 30 mm were returned into the belt dryer, and particles having a diameter of less than 2 mm were returned into the process without further drying.

Example 2

An acrylic acid solution 72 mol % neutralized with aqueous sodium hydroxide solution was polymerized in a batch kneader together with polyethylene glycol diacrylate (diacrylate of polyethylene glycol having an average molecular weight of 400 g/mol). The crumbly polymer gel obtained was dried at 160° C. in a circulating air belt dryer. The dried polymer gel was coarsely comminuted by means of a spiked roll while still in the belt dryer.

The incompletely dried polymeric particles were separated off by means of a sieve having a mesh size of 10 mm. The fraction of separated incompletely dried polymeric particles having a particle diameter of above 10 mm was 20% by weight.

35.0 kg of separated incompletely dried polymeric particles were comminuted by means of a roll mill having a gap width of less than 6 mm and sieved using a sieve having a mesh size of 10 mm. 21.4 kg of polymeric particles having a diameter of less than 10 mm and a water content of less then 1.5% by weight were obtained, and were recycled into the process without further drying.

13.7 kg of separated coarse size having a particle diameter of above 10 mm were comminuted in a mill having sharp beater and a sieve having a mesh size of less than 25 mm as grinding space bound. Analysis of the comminuted coarse size revealed the following values (multiple determination):

| Particle diameter | Amount | Water content |
| --- | --- | --- |
| >4 mm | 10.3 kg | 12-20 wt % |
| 2 to 4 mm | 0.7 kg | 8-10 wt % |
| <2 mm | 2.7 kg | 7-9 wt % |

The comminuted coarse size was returned into the belt dryer.

The invention claimed is:

1. A process for producing water-absorbing polymeric particles comprising the steps of
    i) drying a hydrogel to produce a dried hydrogel,
    ii) separating incompletely dried polymeric particles from the dried hydrogel, wherein the incompletely dried polymeric particles have a water content of at least 10% by weight, and
    iii) drying the separated incompletely dried polymeric particles,
    wherein the separated incompletely dried polymeric particles are comminuted before said drying iii).

2. The process according to claim 1 wherein said drying i) is carried on to such an extent that a fraction of incompletely dried polymeric particles amounts to less than 50% by weight of the dried hydrogel.

3. The process according to claim 1 wherein said separating ii) is carried out such that incompletely dried polymeric particles at least 5 mm in diameter are separated.

4. The process according to claim 1 wherein the incompletely dried polymeric particles are comminuted using a roll mill.

5. The process according to claim 1 wherein the comminuted incompletely dried polymeric particles are classified before said drying iii) and only coarse size is transferred into said drying iii) step.

6. The process according to claim 5 wherein said separated coarse size is comminuted before said drying iii).

7. The process according to claim 6 wherein said separated coarse size is comminuted by means of a mill having sharp beaters or blades and further a sieve as grinding space bound.

8. The process according to claim 6 wherein comminuted coarse size is classified before said drying iii), oversize is combined with coarse size, undersize is combined with the dried hydrogel, and only midsize is transferred into said drying iii) step.

9. The process according to claim 1 wherein said drying i) and said drying iii) are carried out in the same dryer.

10. The process according to claim 1 wherein further comminution is effected during said drying iii).

11. The process according to claim 10 wherein a shovel dryer is used for comminuting and drying.

12. The process according to claim 1 wherein the comminuted dried polymeric particles obtained after said drying iii) are further comminuted.

13. The process according to claim 12 wherein the comminuted dried polymeric particles are further comminuted using a roll mill.

14. The process according to claim 1 wherein the separated incompletely dried polymeric particles, after comminution, drying, and optional further comminution, are recycled into said separating ii) step.

15. The process according to claim 1 wherein the water-absorbing polymer is formed by a solution polymerization, and a polymerized monomer solution comprises acrylic acid and at least one crosslinker copolymerizable with acrylic acid.

16. The process according to claim 15 wherein at least 50 mol % of the monomers of said monomer solution are acrylic acid and/or salts thereof.

17. The process according to claim 1 wherein polymeric particles not separated off in said separating ii) step are ground and classified.

18. The process according to claim 17 wherein the classified polymeric particles are postcrosslinked.

19. A hygiene article comprising water-absorbing polymeric particles prepared by the method of claim 1.

* * * * *